US007770485B2

(12) United States Patent
Suzuki

(10) Patent No.: US 7,770,485 B2
(45) Date of Patent: Aug. 10, 2010

(54) CONTROL LEVER SYSTEM

(75) Inventor: Toshiyuki Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 11/510,663

(22) Filed: Aug. 28, 2006

(65) Prior Publication Data
US 2007/0068328 A1 Mar. 29, 2007

(30) Foreign Application Priority Data
Aug. 31, 2005 (JP) ............................. 2005-252347

(51) Int. Cl.
*B25J 17/02* (2006.01)
(52) U.S. Cl. .................. 74/471 R; 74/473.19; 74/473.2
(58) Field of Classification Search ............... 74/471 R, 74/473.1, 473.19, 473.2
See application file for complete search history.

(56) References Cited

U.S. PATENT DOCUMENTS

| 3,566,711 A | * | 3/1971 | Leuenberger | ............. 74/483 R |
|---|---|---|---|---|
| 4,819,506 A | * | 4/1989 | Matsumoto | ................ 74/665 T |
| 5,275,254 A | * | 1/1994 | Shiraishi et al. | ............. 180/248 |
| 2004/0250649 A1 | * | 12/2004 | Oota | ........................... 74/650 |
| 2007/0235242 A1 | * | 10/2007 | Nozaki et al. | ............... 180/247 |

FOREIGN PATENT DOCUMENTS

JP       2002-307969 A       10/2002

* cited by examiner

*Primary Examiner*—Thomas R Hannon
*Assistant Examiner*—Terence Boes
(74) *Attorney, Agent, or Firm*—Birch, Stewart, Kolasch & Birch, LLP

(57) ABSTRACT

A control lever system permits setting of an appropriate traveling mode with a single control lever by changing over between two-wheel drive and four-wheel drive, changing over a front differential gear between locked and free statuses, and changing over a rear differential gear between locked and free statuses. The single control lever is capable of setting the change-overs in prescribed combinations.

18 Claims, 8 Drawing Sheets

CONTROL LEVER SYSTEM

CROSS-REFERENCE TO RELATED APPLICATIONS

This nonprovisional application claims priority under 35 U.S.C. §119(a) on Patent Application No. 2005-252347, filed in Japan on Aug. 31, 2005, the entirety of which is incorporated herein by reference.

BACKGROUND OF THE INVENTION

1. Field of the Invention

The present invention relates to a control lever system for performing change-overs of the drive line such as changing over the final clutch of a vehicle between two-wheel drive and four-wheel drive, changing over the front differential gear unit between locked and free statuses and changing over the rear differential gear unit between locked and free statuses.

2. Description of Background Art

As an example of a control lever system, a change over with a single control lever between high speed and low speed forward and backward running is known. In such a control lever system, the driver, while holding the steering wheel with the left hand, operates the control lever with the right hand and changes over the transmission to the low speed forward position by shifting the lever from the neutral position rightward and forward. The transmission is changed over to the high speed forward position by shifting the lever from the neutral position leftward and forward. The transmission is changed over to the backward running position by shifting from the neutral position rightward and behind while applying downward pressure (see Japanese Application Laid-Open No. 2002-307969 for instance).

In recent years, along with the diversification of vehicles, there have emerged vehicles which permit change-overs of the drive line such as changing over the final clutch of a vehicle between two-wheel drive and four-wheel drive, changing over the front differential gear unit between locked and free statuses and changing over the rear differential gear unit between locked and free statuses. Such a vehicle is equipped with a control lever for changing over between two-wheel drive and four-wheel drive, a control lever for changing over the front differential gear unit between locked and free statuses, and a control lever for changing over the rear differential gear, each independent of others. In selecting a function of the drive line of the vehicle, the driver has to separately operate the control levers and to conceive a combination of different traveling modes with the control levers.

On the other hand, Japanese Application Laid-Open No. 2002-307969 cited above is not concerned with changing over between two-wheel drive and four-wheel drive, changing over the front differential gear between locked and free statuses and changing over the rear differential gear between locked and free statuses.

SUMMARY OF THE INVENTION

An object of the present invention is to obviate the problem noted above and provide a control lever system which permits setting of an appropriate traveling mode by changing over between two-wheel drive and four-wheel drive, changing over the front differential gear between locked and free statuses and changing over the rear differential gear between locked and free statuses with a single control lever.

In order to achieve the object stated above, a first aspect of the present invention is directed to a control lever system for changing over a final clutch between two-wheel drive and four-wheel drive; changing over a front differential gear unit between locked and free statuses; and changing over a rear differential gear unit between locked and free statuses. The control lever system is provided with a single control lever for changing over the final clutch between two-wheel drive and four-wheel drive; changing over the front differential gear unit between locked and free statuses; and changing over the rear differential gear unit between locked and free statuses. The change-over between two-wheel drive and four-wheel drive of the final clutch, the change-over between locked and free statuses of the front differential gear unit and the change-over between locked and free statuses of the rear differential gear unit can be set to prescribed combinations with the single control lever.

According to a second aspect of the present invention, the control lever is capable of setting at least two of a first state in which the final clutch is set for two-wheel drive, the front differential gear unit is set for a free status and the rear differential gear unit is set for a free status; a second state in which the final clutch is set for four-wheel drive, the front differential gear unit is set for a free status and the rear differential gear unit is set for a locked status; and a third state in which the final clutch is set for four-wheel drive, the front differential gear unit is set for a locked status and the rear differential gear unit is set for a locked status.

A third aspect of the present invention is directed to a control lever system provided with a first arm member and an engaging member operated with a control lever. The first arm member operates along with a movement in parallel to a first locus of the control lever and the engaging member engages with the first arm member along with a movement in parallel to a second locus of the control lever, which crosses the first locus.

According to a fourth aspect of the present invention, a second arm member operates along with a movement in parallel to a third locus, crosses the second locus of the control lever, and keeps the first arm member and the engaging member engaged with each other.

According to a fifth aspect of the present invention, the control lever is a single control lever for: changing over the final clutch between two-wheel drive and four-wheel drive; changing over the front differential gear unit between locked and free statues; and changing over the rear differential gear unit between locked and free statuses. The first arm member is coupled to the final clutch and the rear differential gear unit, and the second arm member is coupled to the front differential gear unit.

According to the first aspect of the present invention, operation of a single control lever can achieve the optimal combination, relevant to driving, of changing over the final clutch between two-wheel drive and four-wheel drive, changing over the front differential gear unit between locked and free statuses, and changing over the rear differential gear unit between locked and free statuses.

According to the second aspect of the present invention, the control lever can select the optimal traveling mode out of first, second and third states according to the situation of the road surface or the like by setting at least two of: the first state in which the final clutch is set for two-wheel drive, the front differential gear unit is set for a free status, and the rear differential gear unit is set for a free status; the second first state in which the final clutch is set for four-wheel drive, the front differential gear unit is set for a free status, and the rear differential gear unit is set for a locked status; and the third state in which the final clutch is set for four-wheel drive, the front differential gear unit is set for a locked status, and the rear differential gear unit is set for a locked status.

According to the third aspect of the present invention, changing over can be accomplished in a simple configuration according to the lever ratio of the first arm member and with the engaging member by causing the first arm member to operate along with a movement in parallel to a first locus of the control lever and the engaging member to engage with the first arm member along with a movement in parallel to a second locus of the control lever which crosses the first locus.

According to the fourth aspect of the present invention, changing over can be accomplished in a simple configuration according to the lever ratio of the second arm member by further providing a second arm member which operates along with a movement in parallel to a third locus, which crosses the second locus of the control lever, while keeping the first arm member and the engaging member engaged with each other, and there accordingly is a cost advantage.

According to the fifth aspect of the present invention, the control lever is a single control lever for changing over the final clutch between two-wheel drive and four-wheel drive, changing over the front differential gear unit between locked and free statuses and changing over the rear differential gear unit between locked and free statuses; and the optimal combination relevant to driving can be achieved and a simple structure can be created without requiring a complex mechanism in-between by coupling the first arm member to the final clutch and the rear differential gear unit and coupling the second arm member to the front differential gear unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
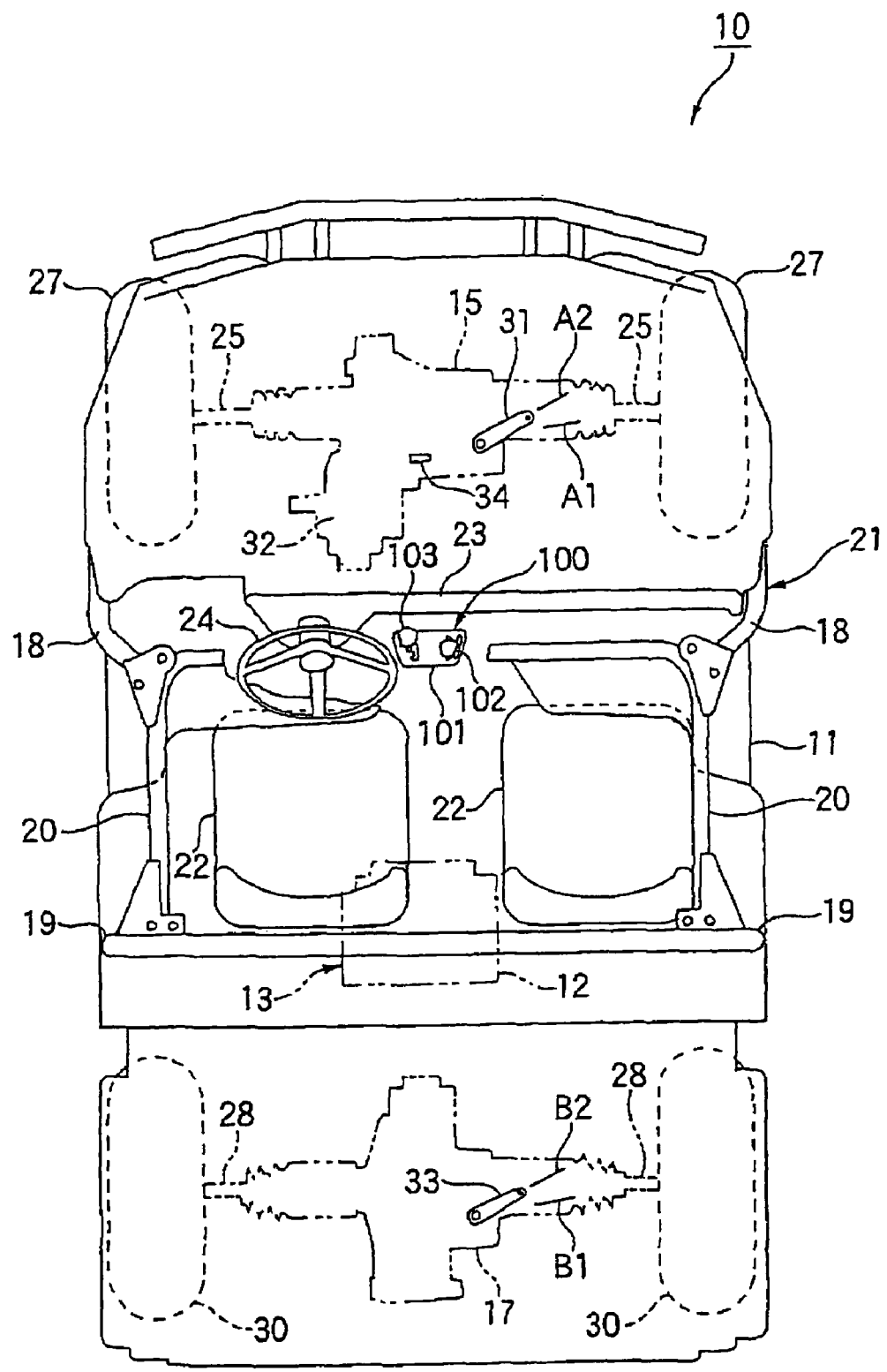
FIG. 1 is a plan of a vehicle mounted with the control lever system pertaining to the present invention.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 2:
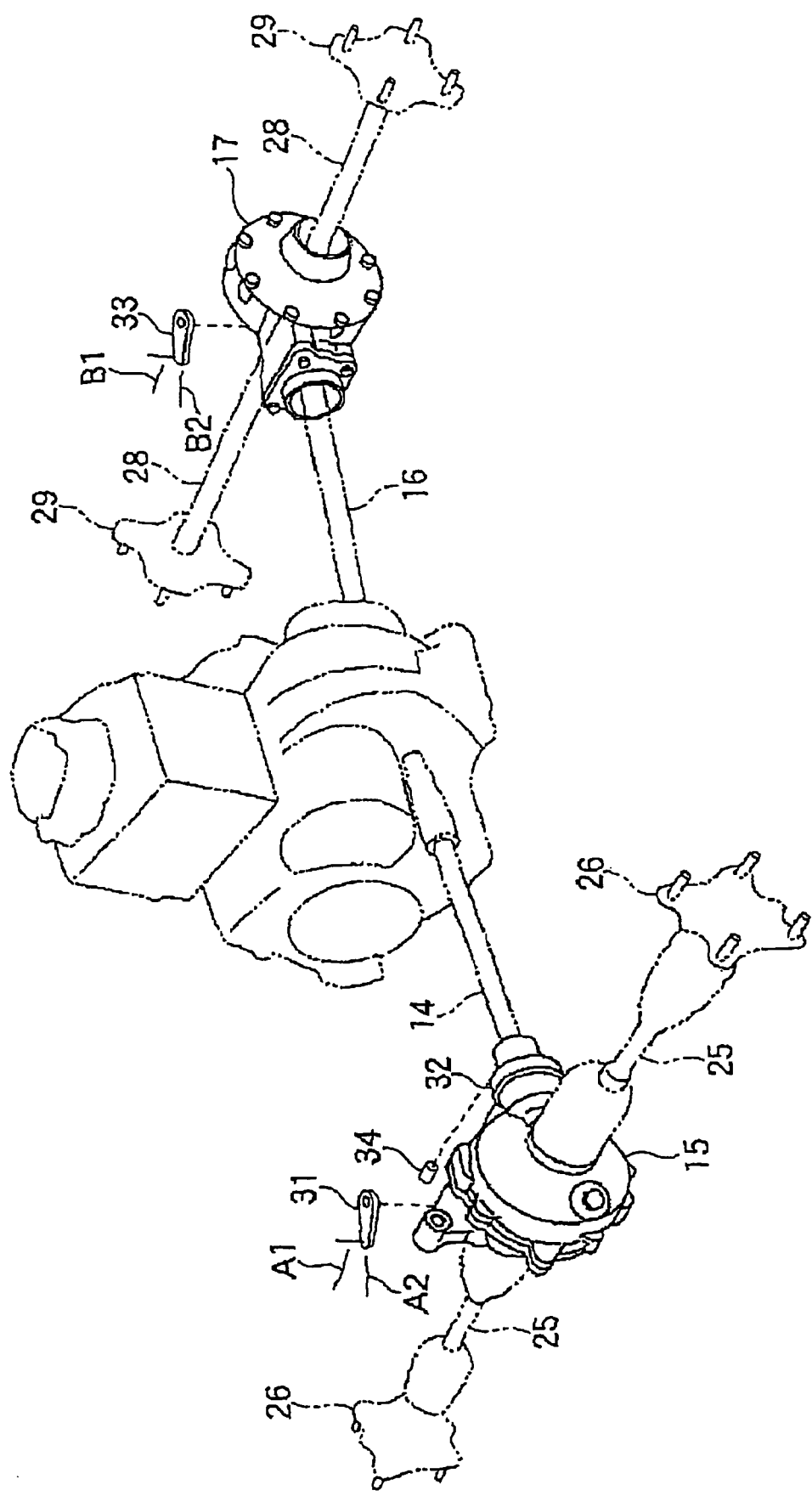
FIG. 2 is an external view of the drive line in the vehicle shown in FIG. 1.
Figure 3:
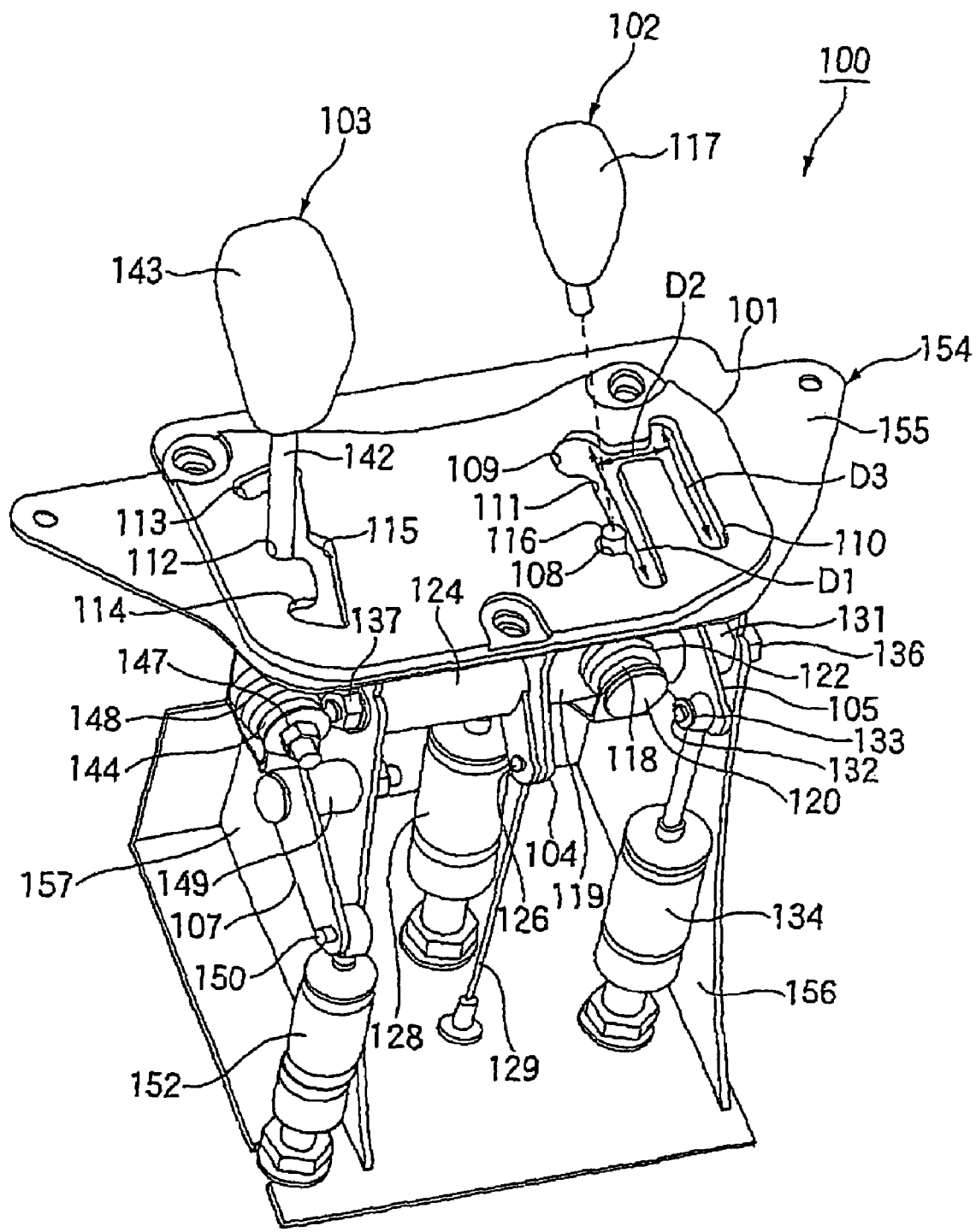
FIG. 3 is an external perspective view of the control lever system shown in FIG. 1.
Figure 4:
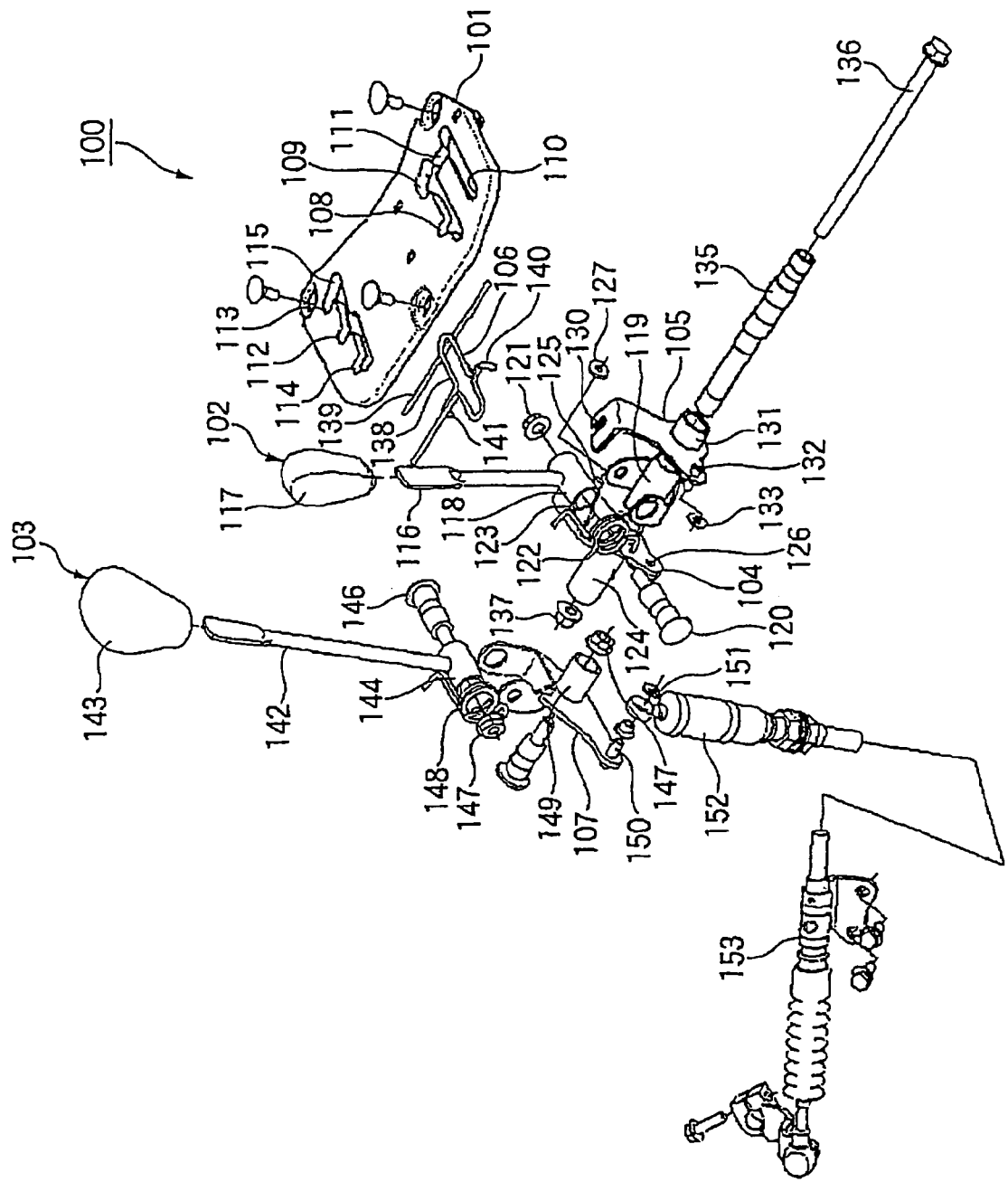
FIG. 4 is an exploded perspective view of the components of the control lever system shown in FIG. 3.
Figure 5A:
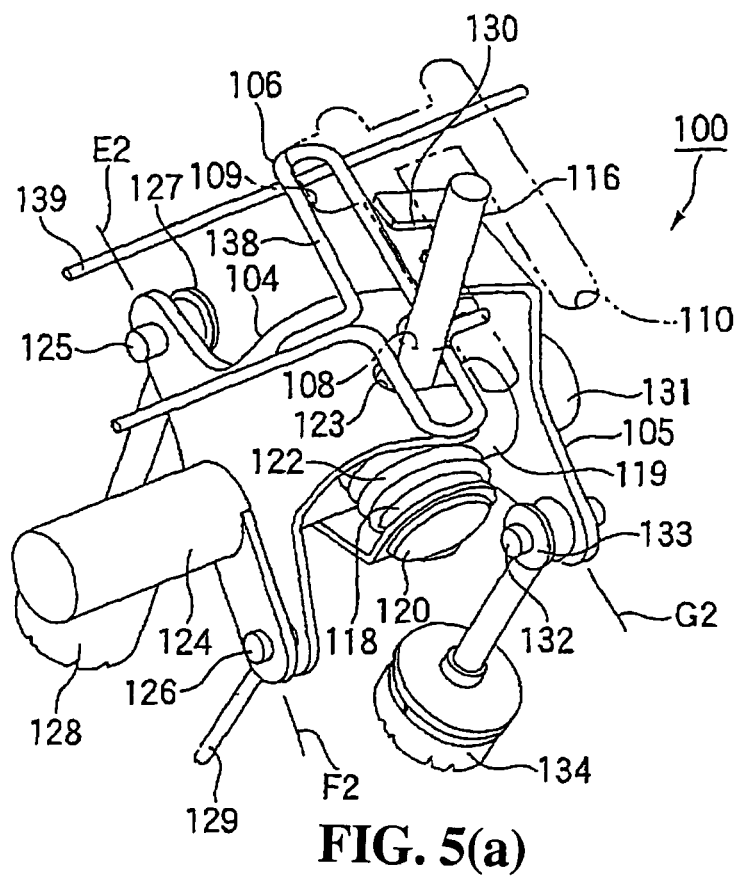
FIG. 5(a) is an external perspective view of the first state of the control lever system shown in FIG. 3 as seen from above the shift gate panel.
Figure 5B:
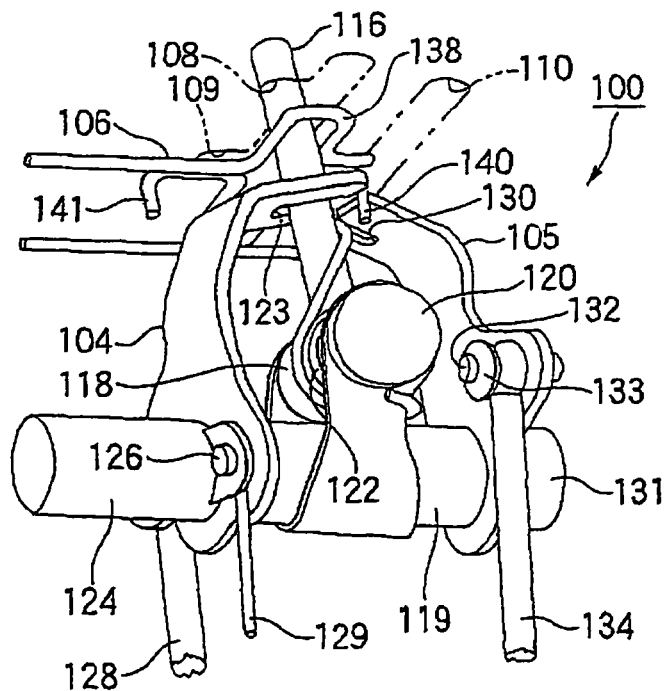
FIG. 5(b) is an external perspective view of (a) as seen from underneath the shift gate panel.
Figure 6A:
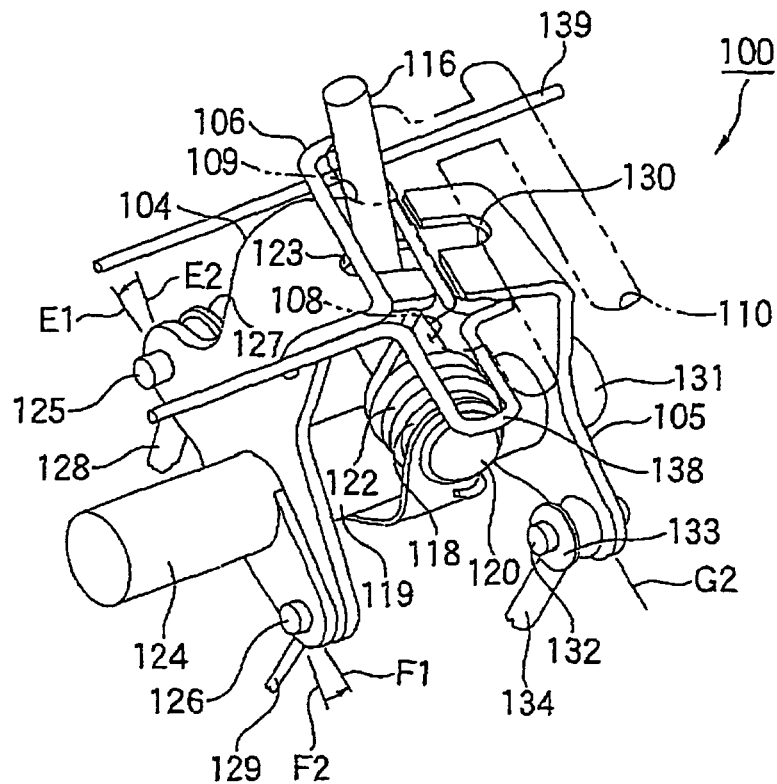
FIG. 6(a) is an external perspective view of the second state of the control lever system shown in FIG. 3 as seen from above the shift gate panel.
Figure 6B:
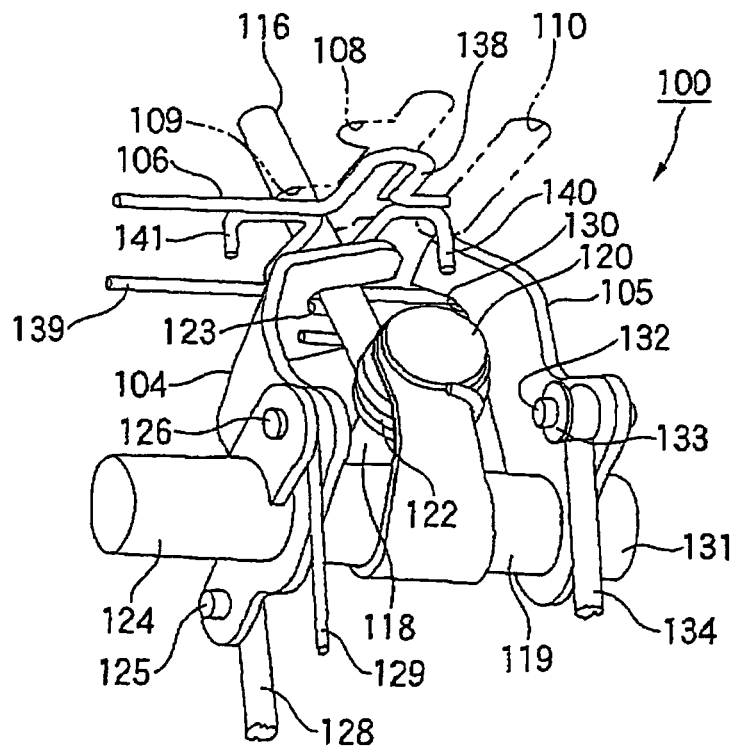
FIG. 6(b) is an external perspective view of (a) as seen from underneath the shift gate panel.
Figure 7A:
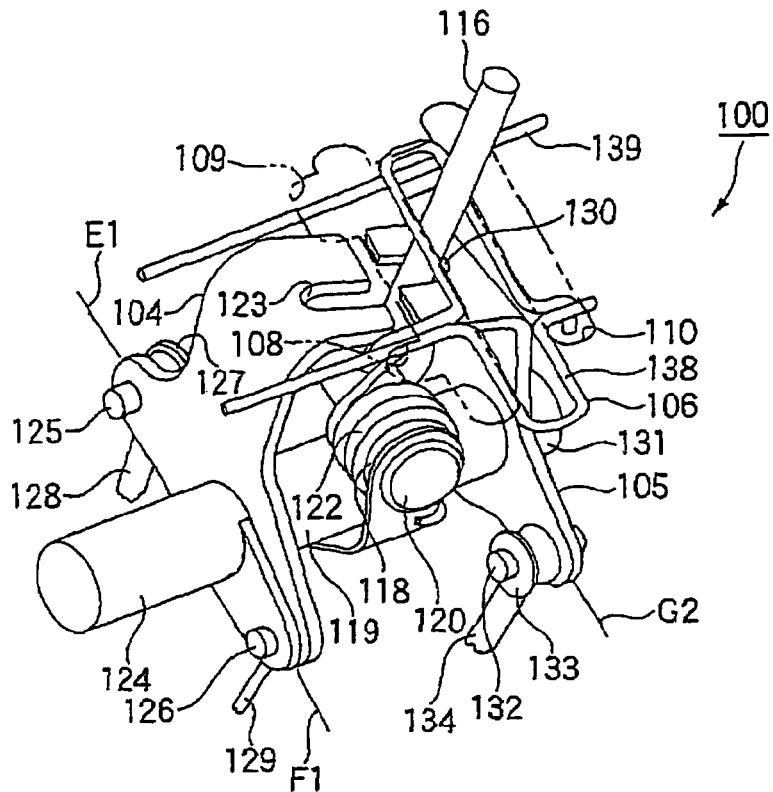
FIG. 7(a) is an external perspective view of the control lever system shown in FIG. 3 during operation from the second state to the third state as seen from above the shift gate panel.
Figure 7B:
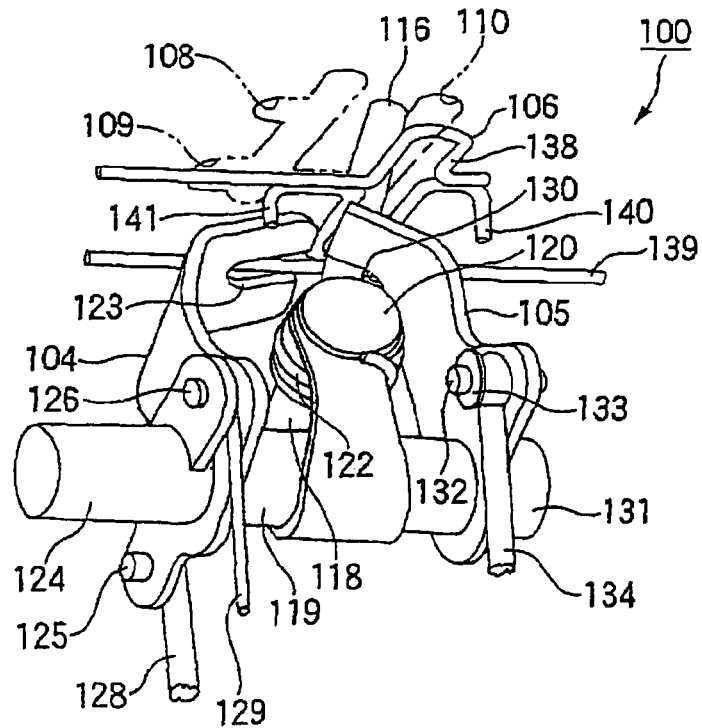
FIG. 7(b) is an external perspective view of FIG. 7(a) as seen from underneath the shift gate panel.
Figure 8A:
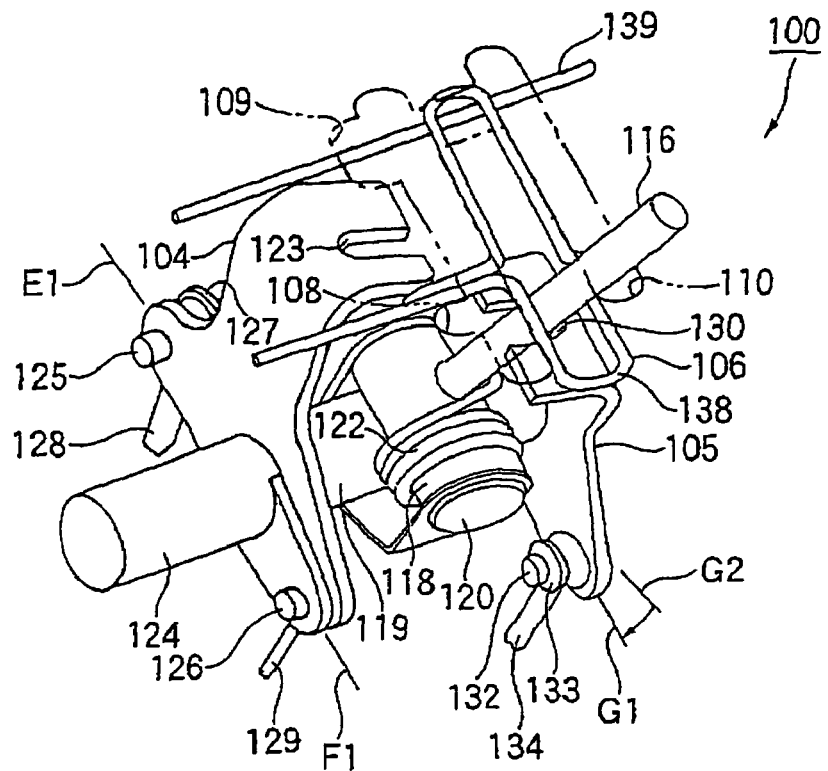
FIG. 8(a) is an external perspective view of the third state of the control lever system shown in FIG. 3 as seen from above the shift gate panel.
Figure 8B:
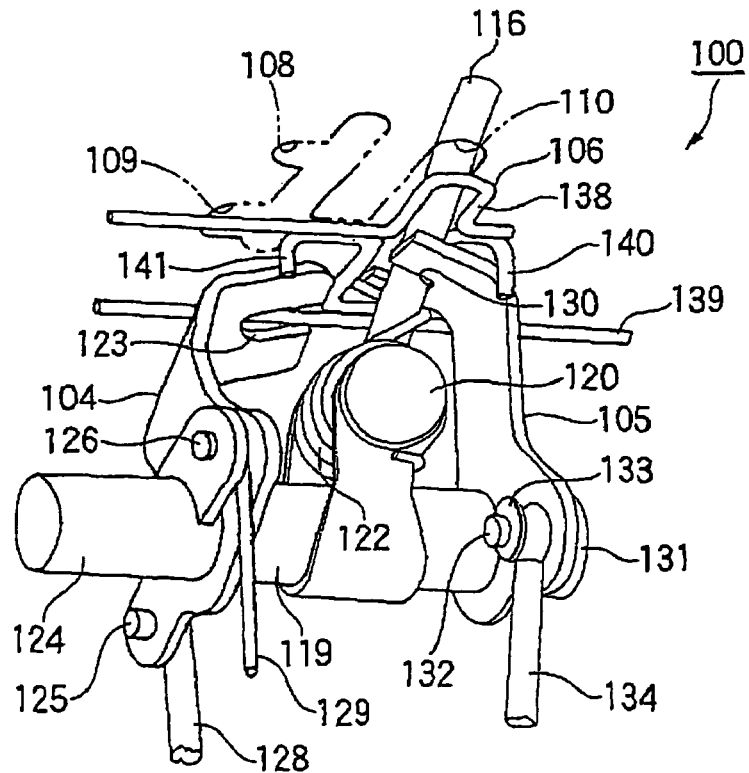
FIG. 8(b) is an external perspective view of FIG. 8(a) as seen from underneath the shift gate panel.

FIG. 1 through FIGS. 8(a) and (b) illustrate a first embodiment of the present invention, wherein FIG. 1 is a plan of a vehicle mounted with the control lever system pertaining to the invention; FIG. 2 is an external perspective view of the drive line in the vehicle shown in FIG. 1; FIG. 3 is an external perspective view of the control lever system shown in FIG. 1; and FIG. 4 is an exploded perspective view of the components of the control lever system shown in FIG. 3. FIG. 5 (a) is an external perspective view of the first state of the control lever system shown in FIG. 3 as seen from above a shift gate panel and FIG. 5 (b) is an external perspective view of FIG. 5 (a) as seen from underneath the shift gate panel. FIG. 6 (a) is an external perspective view of the second state of the control lever system shown in FIG. 3 as seen from above the shift gate panel; and FIG. 6 (b) is an external perspective view of FIG. 6 (a) as seen from underneath the shift gate panel. FIG. 7 (a) is an external perspective view of the control lever system shown in FIG. 3 during operation from the second state to the third state as seen from above the shift gate panel; and FIG. 7 (b) is an external perspective view of FIG. 7 (a) as seen from underneath the shift gate panel. FIG. 8 (a) is an external perspective view of the third state of the control lever system shown in FIG. 3 as seen from above the shift gate panel; and FIG. 8 (b) is an external perspective view of FIG. 8 (a) as seen from underneath the shift gate panel. In the following description, "front", "rear", "left" and "right" refer to the respective directions as they pertain to the driver.

As shown in FIG. 1, a vehicle 10 is a MUV (Multi Utility Vehicle, a multi-purpose four-wheeled vehicle), which is a midship type vehicle that has a power unit 13 consisting of an engine 12 and a transmission arranged in the middle part of a frame 11. A front differential gear unit 15 is coupled ahead of the power unit 13 via a front side propeller shaft 14 (see FIG. 2). A rear differential gear unit 17 is coupled behind the power unit 13 via a rear side propeller shaft 16 (see FIG. 2).

A roll cage 21 is assembled on the frame 11. The roll cage 2 consists of a pipe member 18 for an A pillar, a pipe member 19 for a B pillar and a coupling pipe member 20. A cargo bed (not shown) is fitted behind the roll cage. Seats 22 are laterally arranged on the frame 11. The seats 22 are fitted over the power unit 13. An instrument panel 23 is arranged in front of the left seat 22. A steering wheel 24 is arranged on the left side of the instrument panel 23.

The shift gate panel 101 of a control lever system 100 is arranged in the central part of the instrument panel 23. A traveling mode change-over lever 102 and a shift lever 103 are arranged on the shift gate panel 101.

As shown in FIG. 2, the base end parts of a pair of front drive shafts 25 and 25 are coupled to the front differential gear unit 15. Front wheels 27 and 27 (see FIG. 1) are fixed to the hubs 26 and 26 fixed to the tips of the front drive shafts 25 and 25. The base end parts of a pair of rear drive shafts 28 and 28 are coupled to the rear differential gear unit 17. Rear wheels 30 and 30 (see FIG. 1) are fixed to the hubs 29 and 29 fixed to the tips of the rear drive shafts 28 and 28.

The front differential unit 15 has a front side locked/free status change-over lever 31 which changes over between a lock position A1 in which a built-in differential gear mechanism (not shown) and an intermediate shaft (not shown) are integrally coupled, and a free position A2 in which the differential gear mechanism is not coupled to the intermediate shaft.

A final clutch 32 for changing over between two-wheel drive and four-wheel drive, and a final change-over switch 34 which changes over with electromagnetic change-over means such as a solenoid an input shaft (not shown) to which rotational power inputted from the front side propeller shaft 14 is transmitted are also provided. An output shaft (not shown) is built into the front differential gear unit 15 between a coupled position and a cut-off position.

The rear differential gear unit 17 has a rear side locked/free status change-over lever 33 which changes over between a lock position B1 in which a built-in differential gear mechanism (not shown) and an intermediate shaft (not shown) are integrally coupled, and a free position B2 in which the differential gear mechanism is not coupled to the intermediate shaft.

When a power transmission sleeve (not shown) in the final clutch 32 is in a not coupled position, the front side locked/free status change-over lever 31 is in the free position A2 and the rear side locked/free status change-over lever 33 is in the free position B2, two-wheel drive is set wherein both the differential gear mechanism of the front differential gear unit 15 and the differential gear mechanism of the rear differential gear unit 17 are free. This causes the rotational power outputted from the power unit 13 to be converted into two-wheel drive by only the rear wheels 30 (see FIG. 1) via only the rear differential gear unit 17 in a free wheel state.

When the power transmission sleeve (not shown) in the final clutch 32 is in the coupled position, the front side locked/free status change-over lever 31 is in the free position A2 and the rear side locked/free status change-over lever 33 is changed over to the lock position B1, four-wheel drive is set wherein the differential gear mechanism of the front differential gear unit 15 is free and the differential gear mechanism of the rear differential gear unit 17 is locked. This causes the rotational power outputted from the power unit 13 to be converted into four-wheel drive via the front differential gear unit 15 in a free wheel state and the rear differential gear unit 17 in a locked wheel state.

When, unlike the foregoing, the power transmission sleeve (not shown) in the final clutch 32 is in the coupled position, the front side locked/free status change-over lever 31 is changed over to the lock position A1 and the rear side locked/free status change-over lever 33 is changed over to the lock position B1, four-wheel drive is set wherein the differential gear mechanism of the front differential gear unit 15 is locked and the differential gear mechanism of the rear differential gear unit 17 is locked. This causes the rotational power outputted from the power unit 13 to be converted into four-wheel drive via the front differential gear unit 15 in a locked wheel state and the rear differential gear unit 17 in a locked wheel state.

The control lever system 100 will now be described in detail with reference to FIGS. 3 and 4. The control lever system 100 is mainly composed of the shift gate panel 101, the traveling mode change-over lever 102, a first arm member 104, a second arm member 105, an engaging member 106, a shift lever 103, and a third arm member 107.

The shift gate panel 101 has a first gate 111 located on the right and a second gate 115 on the left. The first gate 111 includes a first state setting recess 108, a second state setting recess 109 and a third state setting recess 110, consecutively cut in a U shape. The second gate 115 includes a low-speed traveling setting recess 112, a high-speed traveling setting recess 113 and a backward traveling recess 114, consecutively cut in an I shape.

The traveling mode change-over 102 comprises a lever shaft 116, a knob 117 fixed to the tip of the lever shaft 116 and a cylindrical member 118 fixed to the base end part of the lever shaft 116. A pin 120 is inserted into the cylindrical member 118 via a cylindrically shaped first pivot member 119. Screwing a nut 121 onto the pin 120 results in rotatable supporting of the lever shaft 116 by the first pivot member 119. A return spring 122 with one end engaged with the first pivot member 119 is engaged with the lever shaft 116 by the other end. Pressure is applied to the lever shaft 116 in a counterclockwise turning direction, as seen in FIG. 3, by the elastic restitutive force of the return spring 122.

The first arm member 104 has a recess 123 at its L-shaped tip for lever insertion, and at its base end part has a cylindrically shaped second pivot member 124. It further has a rear differential gear unit coupling part 125 in a position backward from the center of the second pivot member 124 by a predetermined distance, and has a final clutch coupling part 126 in a position forward from the center of the second pivot member 124 by a predetermined distance. The rear differential gear unit coupling part 125 is coupled to the rear side locked/free status change-over lever 33 (see FIG. 2) by way of a cable 128 by the fitting of a clevis pin (not shown) via a washer 127. The final clutch coupling part 126 is coupled to the final change-over switch 34 (see FIG. 2) by way of a cable 129.

The second arm member 105 has a recess 130 at its L-shaped tip for lever insertion, and at its base end part has a cylindrically shaped third pivot member 131. It further has a front differential gear unit coupling part 132 in a position backward from the center of the third pivot member 131 by a predetermined distance. The front differential gear unit coupling part 132 is coupled to the front side locked/free status change-over lever 31 (see FIG. 2) by way of a cable 134 by the fitting of clevis pin (not shown) via a washer 133.

The first arm member 104 and the second arm member 105 are supported by a collar 135 to be rotatable in the circumferential direction of the collar 135, since the collar 135 is inserted into the second, first, and third pivot members 124, 119 and 131, a bolt 136 is inserted into the collar 135 and then a nut 137 is screwed onto the third pivot member 131 side end of the bolt 136.

The engaging member 106 is molded of a member made of metal, such as steel. The engaging member 106 has an elliptic part 138 matching the length from the first state setting recess 108 to the second state setting recess 109 in the shift gate panel 101. A linear part 139 is arranged orthogonal to the elliptic part 138. Stubs 140 and 141 protrude downward on both outsides of the long sides of the elliptic part 138. The engaging member 106 is supported on the rear face of the shift gate panel 101 to be movable left and right. The lever shaft 116 of the traveling mode change-over lever 102 is inserted into the elliptic part 138.

The shift lever 103 comprises a lever shaft 142, a knob 143 fixed to the tip of the lever shaft 142, and a cylindrical member 144 fixed to the base end part of the lever shaft 142. A pin 146 is inserted into the cylindrical member 144 via the third arm member 107. Screwing of a nut 147 onto the pin 146 results in a rotatable supporting of the lever shaft 142 by the third arm member 107. The lever shaft 142 one of whose ends is engaged with the third arm member 107 by the other end, pressure is applied to the lever shaft 142 in a counterclockwise turning direction, as seen in FIG. 3, by the elastic restitutive force of the return spring 148.

The third arm member 107 has a fifth pivot member 149 whose central part forms a cylindrical shape, and has a transmission coupling part 150 in a position backward from the center of the fifth pivot member 149 by a predetermined distance. The transmission coupling part 150 is coupled by way of a cable 152 to a speed-change mechanism, which the transmission of the power unit 13 has, by the insertion of a clevis pin (not shown) via a washer 151.

Incidentally, the shift gate panel 101 is arranged on the headlining board 155 of a shift gate frame 154. The shift gate frame 154 is supported by two vertical plates 156 and 157. Further, the third arm member 107 is supported by the vertical plate 157. The arm members 104 and 105 are supported by the vertical plates 156 and 157 via the nut 137, the collar 135 and the bolt 136.

In such a control lever system 100, the rear differential gear unit coupling part 125 of the first arm member 104 is turned between a free position E2 (see FIG. 5 (a)) and a lock position E1 (see FIG. 6 (a)) along with the movement of the traveling mode change-over lever 102 from the first state setting recess 108 in the first gate 111 in parallel to a first locus line D1 (see FIG. 3), which is the direction of movement toward the second state setting recess 109. In this process, the final clutch coupling part 126 is turned between a cut-off position F2 (see FIG. 5 (a)) and a coupled position F1 (see FIG. 6 (a)). Furthermore, the engaging member 106 engages with the first arm member 104 along with the movement of the traveling mode change-over lever 102 in parallel to a second locus line D2 (see FIG. 3) which crosses the first locus line D1. The front differential gear unit coupling part 132 of the second arm member 105 is turned between a free position G2 (see FIG. 5 (a)) and a lock position G1 (see FIG. 8 (a)) along with the movement of the traveling mode change-over lever 102 in parallel to a third locus line D3 (see FIG. 3) which crosses the second locus line D2.

The operation of the control lever system 100 will now be described in detail with reference to FIGS. 5 (a) and 5(b) through FIGS. 8 (a) and 8(b).

As shown in FIGS. 5 (a) and 5(b), when the traveling mode change-over lever 102 is in the first state setting recess 108, the rear differential gear unit coupling part 125 is in the free position E2 and the final clutch coupling part 126 is in the cut-off position F2.

In the second arm member 105, since the lever shaft 116 is not inserted into the recess 130 for lever insertion and the stub 140 of the engaging member 106 is engaged in the rotating direction, rotation is inhibited to keep the front differential gear unit coupling part 132 held in the free position G2. As a result of this, the power transmission sleeve in the final clutch 32 is in the cut-off position, the front side locked/free status change-over lever 31 is in the free position A2 (see FIG. 2) and the rear side locked/free status change-over lever 33 is in the free position B2 (see FIG. 2). Therefore, two-wheel drive is set wherein both the differential gear mechanism of the front differential gear unit 15 and the differential gear mechanism of the rear differential gear unit 17 are set to be free. This causes the two-wheel drive mode using only the rear wheels 30 and 30 (see FIG. 1) to be set, wherein the rotational power outputted from the power unit 13 is transmitted via only the rear differential gear unit 17. Setting of the two-wheel drive mode using only the rear wheels 30 and 30 by the driver makes possible driving with the ease of turning the steering wheel 24, suitable for traveling on an even road, such as a paved road, and fuel consumption is also economical.

As shown in FIGS. 6 (a) and 6(b), when the traveling mode change-over lever 102 (see FIG. 3) is shifted from the first state setting recess 108 to the second state setting recess 109, the lever shaft 116 remaining inserted in the recess 123 for lever insertion in the first arm member 104 is displaced forward. This places the rear differential gear unit coupling part 125 in the lock position E1 and the final clutch coupling part 126 in the coupled position F1. Since the second arm member 105 is not turned then, the front differential gear unit coupling part 132 is in the free position G2. Also, the power transmission sleeve in the final clutch 32 is in the coupled position, the front side locked/free status change-over lever 31 is in the free position A2, and the rear side locked/free status change-over lever 33 is placed into the lock position B1 (see FIG. 2).

Four-wheel drive is thereby set, wherein the differential gear mechanism of the front differential gear unit 15 is free and the differential gear mechanism of the rear differential gear unit 17 is locked. In addition, the four-wheel drive mode is set, wherein the rotational power outputted from the power unit 13 is transmitted via the front differential gear unit 15 in the free wheel state and the rear differential gear unit 17 in the locked wheel state. Setting of the four-wheel drive mode using both the front differential gear unit 15 in the free wheel state and the rear differential gear unit 17 in the locked wheel state by the driver makes possible coping with uneven or even road conditions more easily and traveling on a snow-covered road or a slippery road surface.

As shown in FIGS. 7 (a) and 7(b), when the traveling mode change-over lever 102 (see FIG. 3) is disengaged from the second state setting recess 109 and moved rightward against the return spring 122, the lever shaft 116 is disengaged from the recess 123 for lever insertion of the first arm member 104, and the lever shaft 116 inserted into the recess 130 for lever insertion of the second arm member 105. However, since the second arm member 105 is not turned, the rear differential gear unit coupling part 125 remains in the lock position E1, the final clutch coupling part 126 remains in the coupled position F1, and the front differential gear unit coupling part 132 remains in the free position G2.

During this process, since the engaging member 106 moves rightward together with the lever shaft 116 along with the rightward displacement of the lever shaft 116, the stub 141 is engaged in the rotating direction of the first arm member 104, with the result that the rotation is inhibited and the rear differential gear unit coupling part 125 is held in the lock position E1 with the final clutch coupling part 126 being held in the coupled position F1.

As shown in FIGS. 8 (a) and (b), when the traveling mode change-over lever 102 (see FIG. 3), after being disengaged from the second state setting recess 109 and move laterally, is moved to the third state setting recess 110, the lever shaft 116 remaining inserted in the recess 130 for lever insertion of the second arm member 105 is displaced backward, with the result that the front differential gear unit coupling part 132 is placed in the lock position G1. Then, since the rotation of the first arm member 104 is inhibited by the stub 141 of the engaging member 106, the rear differential gear unit coupling part 125 is held in the lock position E1 and the final clutch coupling part 126 is held in the coupled position F1.

This causes the power transmission sleeve in the final clutch 32 to be kept in the coupled position, the front side locked/free status change-over lever 31 to be changed over to the lock position A1, and the rear side locked/free status change-over lever 33 to be kept in the lock position B1 (see FIG. 2). As a result, four-wheel drive is set, wherein the differential gear mechanism of the front differential gear unit 15 is locked and the differential gear mechanism of the rear differential gear unit 17 is locked. In addition, the four-wheel drive mode is set, wherein the rotational power outputted from the power unit 13 is transmitted via the front differential gear unit 15 in the locked wheel state and the rear differential gear unit 17 in the locked wheel state. Setting of the four-wheel drive mode using the front differential gear unit 15 in the locked wheel state and the rear differential gear unit 17 in the locked wheel state by the driver can be utilized for getting rid of a state of being stuck in a muddy road or the like.

By the control lever system 100 described above, operation of a single traveling mode change-over lever 102 can achieve the optimal combination, relevant to traveling, of change-over of the final clutch 32 between two-wheel drive and four-wheel drive; change-over of the front differential gear unit 15 between locked and free statuses; and change-over of the rear differential gear unit 17 between locked and free statuses.

Also by the control lever system 100 described above, the traveling mode change-over lever 102 can select the optimal traveling mode out of first, second and third states according to the situation of the road surface or the like by setting at least two or three of: the first state in which the final clutch 32 is set for two-wheel drive, the front differential gear unit 15 is set for a free status, and the rear differential gear unit 17 is set for a free status; the second first state in which the final clutch 32 is set for four-wheel drive, the front differential gear unit 15 is set for a free status, and the rear differential gear unit 17 is set for a locked status; and the third state in which the final clutch 32 is set for four-wheel drive, the front differential gear unit 15 is set for a locked status, and the rear differential gear unit 17 is set for a locked status.

Also by the control lever system 100 described above, operation of a single traveling mode change-over lever 102 can achieve the optimal combination, relevant to traveling, of: change-over of the final clutch 32 between two-wheel drive and four-wheel drive; change-over of the front differential gear unit 15 between locked and free statuses; and change-over of the rear differential gear unit 17 between locked and free statuses. Further, there are provided with the first arm member 104 which operates along with the movement of the traveling mode change-over lever 102 in parallel to the first locus line D1 and the engaging member 106 which engages with the first arm member 104 along with the movement of the traveling mode change-over lever 102 in parallel to the second locus line D2 which crosses the first locus line D1. This enables changing over to be accomplished according to the lever ratio of the first arm member 104 and with the engaging member 106 in a simple configuration and with a cost advantage without requiring a large operating force.

Also by the control lever system 100 described above, by disposing the second arm member 105 which operates along with the movement of the traveling mode change-over lever 102 in parallel to the third locus line D3 which crosses the second locus line D2, it is made possible to accomplish changing over according to the lever ratio of the second arm member 105 in a simple configuration and with a cost advantage without requiring a large operating force.

Also by the control lever system 100 described above, a simple structure can be created without requiring a complex mechanism in-between by coupling the first arm member 104 to the final clutch 32 and the rear differential gear unit 17 and coupling the second arm member 105 to the front differential gear unit 15.

Incidentally, the final clutch may as well be built into the rear differential gear unit, and two-wheel drive with only two front wheels can be accomplished by placing the final clutch in a cut-off state.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control lever system comprising:
   a lever shaft;
   a first arm member; and
   an engaging member defining a through hole surrounded by the engaging member, wherein the lever shaft passes through the through hole such that the engaging member is operated with the lever shaft,
   wherein the first arm member is structurally configured to operate along with a movement in parallel to a first locus of the lever shaft, and the engaging member is structurally configured to engage with the first arm member along with a movement in parallel to a second locus of the lever shaft which crosses the first locus wherein the control lever is a single control lever that changes over a final clutch between two-wheel drive and four-wheel drive, a front differential gear unit between locked and unlocked statuses, and a rear differential gear unit between locked and unlocked statuses, the first arm member is coupled to the final clutch and the rear differential gear unit, and a second arm member is coupled to the front differential gear unit.

2. The control lever system according to claim 1, wherein the second arm member is structurally configured to operate along with a movement in parallel to a third locus, which crosses the second locus of the lever shaft, while keeping the first arm member and the engaging member engaged with each other.

3. The control lever system according to claim 2, wherein said engaging member includes an elliptic part, a linear part arranged generally orthogonal to the elliptic part, and a pair of stubs that protrude downward from long sides of the elliptic part.

4. The control lever system according to claim 2, further comprising a shift gate panel, said shift gate panel including:
   a first gate for receiving the first arm member and having a first state setting recess, a second state setting recess and a third state setting recess consecutively cut in generally a U- shape; and
   a second gate for receiving a shift lever and having a low-speed traveling setting recess, a high-speed traveling recess and a backward traveling recess consecutively cut in generally an I- shape.

5. The control lever system according to claim 1, wherein the through hole is larger than a cross section of the lever shaft such that the lever shaft is movable within the through hole.

6. The control lever system according to claim 1, further comprising a shift gate panel, said shift gate panel including:
   a first gate for receiving the first arm member and having a first state setting recess, a second state setting recess and a third state setting recess consecutively cut in generally a U- shape; and
   a second gate for receiving a shift lever and having a low-speed traveling setting recess, a high-speed traveling recess and a backward traveling recess consecutively cut in generally an I- shape.

7. A control lever system that changes over a final clutch between two-wheel drive and four-wheel drive, a front differential gear unit between locked and unlocked statuses, and a rear differential gear unit between locked and unlocked statuses, the control lever system comprising:

a single control lever structurally configured to change over the final clutch between the two-wheel drive and the four-wheel drive, the front differential gear unit between the locked and unlocked statuses, and the rear differential gear unit between the locked and unlocked statuses, wherein the change-over between the two-wheel drive and the four-wheel drive of the final clutch, the change-over between the locked and unlocked statuses of the front differential gear unit and the change-over between the locked and unlocked statuses of the rear differential gear unit are set to prescribed combinations with the single control lever, wherein the single control lever comprises:

a lever shaft; and an engaging member defining a through hole surrounded by the engaging member, wherein the lever shaft passes through the through hole such that the engaging member is operated with the lever shaft to change over the final clutch between the two-wheel drive and the four-wheel drive, the front differential gear unit between the locked and unlocked statuses, and the rear differential gear unit between the locked and unlocked statuses.

8. The control lever system according to claim 7, wherein the single control lever is structurally configured to set the front differential gear unit at the unlocked status and to set the rear differential gear unit at the unlocked status, thereby changing over the final clutch to the two-wheel drive, and wherein the single control lever is structurally configured to set one of the front differential gear unit and the rear differential gear unit is set at the locked status and to set the other one of the front differential gear unit and the rear differential gear unit at the unlocked status, thereby changing over the final clutch to the four-wheel drive.

9. The control lever system according to claim 8, wherein the single control lever further comprises a first arm member wherein the first arm member operates along with a movement in parallel to a first locus of the lever shaft, and the engaging member engages with the first arm member along with a movement in parallel to a second locus of the lever shaft which crosses the first locus.

10. The control lever system according to claim 9, wherein the single control lever further comprises a second arm member that operates along with a movement in parallel to a third locus, which crosses the second locus of the lever shaft, while keeping the first arm member and the engaging member engaged with each other.

11. The control lever system according to claim 9, wherein said engaging member includes an elliptic part, a linear part arranged generally orthogonal to the elliptic part, and a pair of stubs that protrude downward from long sides of the elliptic part.

12. The control lever system according to claim 9, wherein the single control lever further comprises a shift gate panel, said shift gate panel including:

a first gate for receiving the first arm member and having a first state setting recess, a second state setting recess and a third state setting recess consecutively cut in generally a U- shape; and a second gate for receiving a shift lever and having a low-speed traveling setting recess, a high-speed traveling recess and a backward traveling recess consecutively cut in generally an I- shape.

13. The control lever system according to claim 7, wherein the single control lever further comprises:

a first arm member;

wherein the first arm member operates along with a movement in parallel to a first locus of the lever shaft, and the engaging member engages with the first arm member along with a movement in parallel to a second locus of the lever shaft which crosses the first locus.

14. The control lever system according to claim 13, wherein the single control lever further comprises a second arm member that operates along with a movement in parallel to a third locus, which crosses the second locus of the lever shaft, while keeping the first arm member and the engaging member engaged with each other.

15. The control lever system according to claim 13, wherein said engaging member includes an elliptic part, a linear part arranged generally orthogonal to the elliptic part, and a pair of stubs that protrude downward from long sides of the elliptic part.

16. The control lever system according to claim 13, wherein the single control lever further comprises a shift gate panel, said shift gate panel including:

a first gate for receiving the first arm member and having a first state setting recess, a second state setting recess and a third state setting recess consecutively cut in generally a U-shape; and a second gate for receiving a shift lever and having a low-speed traveling setting recess, a high-speed traveling recess and a backward traveling recess consecutively cut in generally an I-shape.

17. The control lever system according to claim 7, wherein the through hole is larger than a cross section of the lever shaft such that the lever shaft is movable within the through hole.

18. A control lever system comprising:

a first arm member; and an engaging member operated with a control lever, wherein the first arm member operates along with a movement in parallel to a first locus of the control lever, and the engaging member engages with the first arm member along with a movement in parallel to a second locus of the control lever which crosses the first locus, wherein the control lever is a single control lever that changes over a final clutch between two-wheel drive and four-wheel drive, a front differential gear unit between locked and unlocked statuses, and a rear differential gear unit between locked and unlocked statuses, the first arm member is coupled to the final clutch and the rear differential gear unit, and a second arm member is coupled to the front differential gear unit, and wherein said engaging member includes an elliptic part, a linear part arranged generally orthogonal to the elliptic part, and a pair of stubs that protrude downward from long sides of the elliptic part.

* * * * *